(12) United States Patent
Pinhasi et al.

(10) Patent No.: US 9,984,677 B2
(45) Date of Patent: May 29, 2018

(54) BETTERING SCORES OF SPOKEN PHRASE SPOTTING

(71) Applicant: NICE-SYSTEMS LTD, Ra'anana (IL)

(72) Inventors: Alon Pinhasi, Hod-HaSharon (IL); Tzach Ashkenazi, Petah Tikva (IL)

(73) Assignee: NICE LTD., Ra'anana (IL)

( * ) Notice: Subject to any disclaimer, the term of this patent is extended or adjusted under 35 U.S.C. 154(b) by 251 days.

(21) Appl. No.: 14/870,771

(22) Filed: Sep. 30, 2015

(65) Prior Publication Data

US 2017/0092262 A1  Mar. 30, 2017

(51) Int. Cl.
*G10L 15/02* (2006.01)
*G10L 15/08* (2006.01)

(52) U.S. Cl.
CPC .............. *G10L 15/02* (2013.01); *G10L 15/08* (2013.01); *G10L 2015/088* (2013.01)

(58) Field of Classification Search
CPC .... G10L 15/02; G10L 15/08; G10L 2015/088
See application file for complete search history.

(56) References Cited

U.S. PATENT DOCUMENTS

| | | | | |
|---|---|---|---|---|
| 5,625,748 A | * | 4/1997 | McDonough | G10L 15/1822 704/236 |
| 7,650,282 B1 | * | 1/2010 | Morris | G10L 15/187 379/88.01 |
| 9,600,231 B1 | * | 3/2017 | Sun | G06F 3/167 |
| 2011/0004473 A1 | * | 1/2011 | Laperdon | G10L 15/02 704/243 |

* cited by examiner

*Primary Examiner* — Angela A Armstrong
(74) *Attorney, Agent, or Firm* — Soroker Agmon Nordman

(57) ABSTRACT

Embodiments of the disclosed subject matter include a system and method for improving a phrase spotting score. The method may include providing a test speech and a transcription thereof, obtaining an input phrases in a textual form for spotting in the provided test speech, generating a phonetic transcription for the input phrase, and applying a classifying model to the phonetic transcription of the test speech according to a posterior probability feature and to a set of phrase spotting features related to the input phrase, the phrase spotting features selected from features extracted from a decoding process of the phrase, context-based features, and/or a combination thereof, thereby spotting the given phrase with a confidence score. The classifying model is priorly trained for spotting the input phrase according to the posterior probability feature and to the plurality of phrase spotting features.

14 Claims, 7 Drawing Sheets

BETTERING SCORES OF SPOKEN PHRASE SPOTTING

BACKGROUND

The present disclosure generally relates to speech recognition, and more specifically to phrase spotting in a given speech.

Spoken phrase spotting is important functionality in a variety of different technologies such as speech recognition systems and interactive dialog systems. Generally, confidence scores are used to determine whether a word was spotted, recognized or correctly understood. In automatic speech recognition (ASR) systems, for example, confidence scores represent a confidence level of the speech recognition system that the words were correctly identified.

Automatic speech recognition techniques of the art include phonetic-based phrase spotting that commonly uses posterior probability estimation (PPE) to provide a PPE confidence score. Generally, there are two major approaches for computing PPE scores.

One approach is based on acoustic measurements, and deploys two phases on the provided speech. The first phase computes the best word hypotheses, then re-score the hypotheses to compute the PPE scores for each word in the best hypotheses. The first phase uses standard acoustic models, and the second phase uses acoustic models that normalize the log-likelihood functions. The acoustic approach requires the ASR system to provide a background model of the acoustic channel.

Another approach for computing PPE scores is a lattice-based approach, which includes using a result lattice graph to estimate all the possible paths using a forward-backward algorithm. Confidence scores can be assigned to each path and those confidence scores can be used to normalize the hypotheses score.

In certain cases, the PPE score may be unreliable or inaccurate, and it is desirable to improve the reliability of a phrase spotting confidence score produced by an ASR engine, in order to obtain more reliable or accurate phrase spotting results.

BRIEF DESCRIPTION OF TYPE DRAWINGS

Some non-limiting exemplary embodiments or features of the disclosed subject matter are illustrated in the following drawings. Identical or duplicate or equivalent or similar structures, elements, or parts that appear in one or more drawings are generally labeled with the same reference numeral, and may not be repeatedly labeled and/or described.

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

References to previously presented elements are implied without necessarily further citing the drawing or description in which they appear.

FIG. 1 schematically illustrates a system for improving scores of spoken phrase spotting, according to exemplary embodiments of the disclosed subject matter;

SUMMARY

Figure 1:
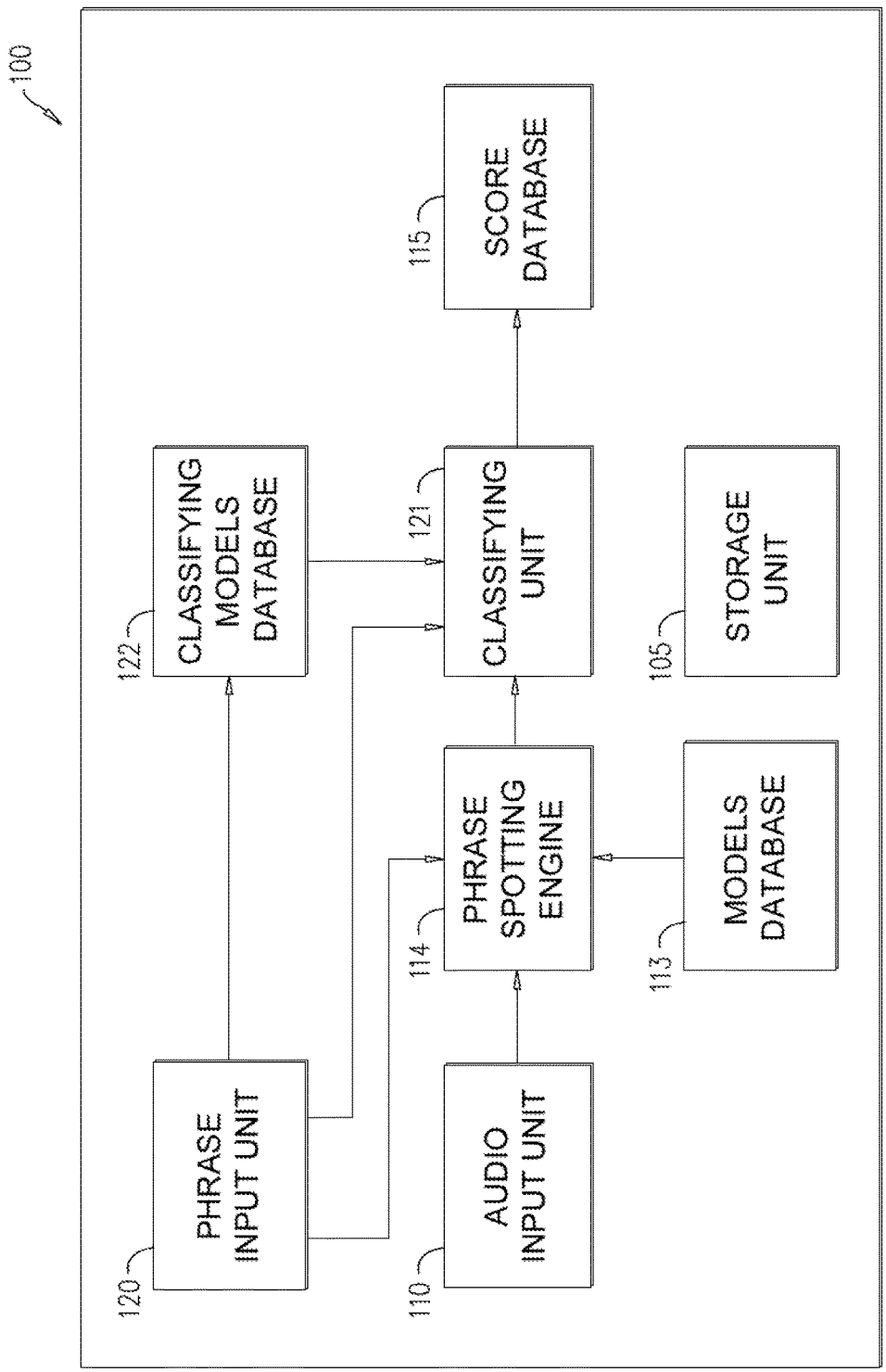

Embodiments of the disclosed subject matter include a system and method for improving a phrase spotting score. The method may include providing a test speech and a transcription thereof, obtaining an input phrases in a textual form for spotting in the provided test speech, generating a phonetic transcription for the input phrase, and applying a classifying model to the phonetic transcription of the test speech according to a posterior probability feature and to a set of phrase spotting features related to the input phrase, the phrase spotting features selected from features extracted from a decoding process of the phrase, context-based features, and/or a combination thereof, thereby spotting the given phrase with a confidence score. The classifying model is priorly trained for spotting the input phrase according to the posterior probability feature and to the plurality of phrase spotting features.

The method is performed on an at least one computerized apparatus configured to perform the method. In some embodiments, the confidence score may be transformed according to a predetermined trained transformation, to obtain a transformed score. The classifying model may be priorly trained to enhance a confidence level of identifying the input phrase, for example, trained according to a target context, language, accent, or scope.

The training of the classifying model may include adaptation of the classifying model to a specific lexicon, and the classifying model may be implemented using a Support Vector Machine (SVM), for example with a linear kernel.

Optional features related to an input phrase may be selected from: phrase-related features, event-related features, decoding process features, context-based features, and combinations thereof. In some embodiments, at least one feature related to an input phrase is based on an edit probability score of the input phrase. In some embodiments, at least one feature related to an input phrase is based on a number of long phonemes of the input phrase. In some embodiments, at least one feature related to an input phrase is based on an edit distance score in a lattice of the input phrase. In some embodiments, at least one feature related to an input phrase is based on a number of possible phonetic transcriptions of the input phrase.

Some embodiments of the method may include calculating one or more trained transformations to obtain a transformed score that is correlated to a predetermined characteristic. A trained monotone transformation may be used to simplify the feature normalization and the SVM model into a single vector in the size of the phrase spotting feature set. A subset of contributing features may be identified from a preliminary set of phrase spotting features.

In some embodiments, the method may include filtering non-robust or correlative features using a cross validation procedure. In some embodiments, identifying a subset of contributing features from a supported set of phrase spotting features may include determining an initial subset of selected features, and for each feature in the supported set of phrase spotting features, adding the feature to or removing the feature from the initial subset of selected features to obtain a temporary subset, training the classifiers using the temporary subset of features. The quality of the phrase spotting results obtained after the phrase spotting classification process may be evaluated using the temporary subset of features.

DETAILED DESCRIPTION

In the context of the present disclosure, without limiting, the term 'phrase' implies a textual construct comprising a word, or a sequence of words such as a sentence, a portion of a sentence or more than one sentence. A phrase may be provided as an audio segment from which one or a sequence of words can be retrieved manually or automatically. In another alternative the phrase may be provided as text, or using a phonetic representation.

In the context of the present disclosure, without limiting, the term 'textual transcription' indicates a conversion or representation of human speech into text symbols, e.g. using the alphabet associated with the language of the speech.

In the context of the present disclosure, without limiting, the term "spotting" is directed to detection of utterances of a given term or terms in a speech. Thus, phrase spotting is directed to detection of utterances of a given phrase of phrases, and word spotting is directed to detection of utterances of a given word or words, and so forth. A detection of an utterance of a given term or phrase is also referred to as a detected event or a candidate event.

In the context of some embodiments of the present disclosure, phrase spotting of the art by posterior probability estimation and/or constituents thereof such a features thereof is used as a baseline for improvement of phrase spotting and for comparison or evaluation of the improvement, and for brevity is collectively referred to also as PPE that stands for posterior probability estimation.

In the context of the present disclosure, without limiting, the term 'phonetic representation' or 'phonetic transcription' implies a representation of speech sounds using textual symbols in phonetic alphabet of the art, such as IPA, X-SAMPA or Kirshenbaum.

Generally, in the context of the present disclosure, without limiting, a language model is any construct reflecting occurrences of words or textual terms in a given vocabulary, so that, by employing the language model, texts of and/or related to the vocabulary provided to the language model can be recognized, at least to a certain faithfulness, such as by a speech recognition apparatus. Without limiting, a language model is a statistical language model where words or textual terms are assigned probability of occurrence, or weights, by means of a probability distribution given the words that appeared in the sentence before them. Such a model is referred to herein, representing any language model such as known in the art. A language model may be applied during speech recognition to generate text transcriptions from audio data.

In the context of the present disclosure without limiting, the term 'trainer' denoted person performing and/or supervising and/or controlling training of a classifying model.

For brevity, in the context of the present disclosure, without limiting, referring to circumstances of a phrase includes or may include characteristics of the context of the phrase and/or characteristics related to decoding of the phrase or of the speech in which the phrase appears speech.

For brevity, in the context of the present disclosure, without limiting, referring to features related to a phrase includes or may include features related to a phrase and circumstances thereof.

The terms cited above denote also inflections and conjugates thereof.

One technical problem dealt by the disclosed subject matter is improving the reliability of a phrase spotting score in a speech relative to the PPE score of the art.

One technical solution according to the disclosed subject matter is formulating, for a phrase intended for spotting, a plurality of features that characterize aspects related to the phrase, to the context of the phrase, to the engine behavior during its search of the phrase, and/or to circumstances thereof, and applying the PPE feature together with at least a subset of the plurality of features to a classifying model that classifies whether a phonetic representation of the phrase is found in a provided speech, thereby obtaining from the classifying model a confidence score of spotting the phrase in the provided speech that is better than a score based solely on the PPE.

The classifying model, when referred to herein, may include data related to the classification operation performed to spot a phrase in a given speech. The classifying model may include one or more databases, e.g. a classifier model database, a phrase spotting features list or database, and/or a transformation model database. The classifying model may further include the operations, functions, steps or rules required for performing the classification operation to spot a phrase in a given speech. For example, the classifying model may include a features calculation unit, one or more classifiers, one or more score transformations, and related data such as sets of rules and conditions according to which an appropriate set of features, classifier model or transformation model may be applied during the classification operation.

The classifying model is constructed in a prior training phase using a satisfactorily or sufficiently large corpus of speech and its textual transcription referred to also as the training set, and training or adapting the classifying model according to the PPE feature along with the plurality of phrase-spotting features intended for spotting, to identify or spot a phonetic representation of the phrase in the training set. Alternatively, the events detected by the engine (the engine results) may be marked as true or false, e.g. manually by a trainer.

In order to provide for detecting occurrences of a phrase intended for spotting (e.g. detect a candidate event), in a prior training or preparatory phase the classifying model is trained, that is, adapted, to improve identification or spotting according to the PPE feature and simultaneously with the plurality of phrase spotting features, a phonetic representation of the phrase in a satisfactorily or sufficiently large corpus of speech. The adaptation of the classifying model is generally directed to realistically and/or practically maximize or optimize the overall reliability or confidence of identifying the phrase in view of variability of a speech.

In some embodiments or cases, the context or realm of phrase spotting may vary. For example, by a language, a dialect, a profession, a scope such as products, an activity such as sales or service or product support, or by any other individuality such as an accent. Accordingly, the training of the classifying model is carried out based on a training set and phrases pertaining to the particular context or realm.

Training and application of the classifying model is multidimensional in the sense that the plurality of features together with the PPE feature are used or served, at least virtually, as dimensions that delimit the classification domain. Thus the dimensionality is according to the total number of features that participate in the classification process, which includes the PPE feature and a plurality of phrase spotting features.

The phrase spotting features are selected and/or decided to provide at least a satisfactory or acceptable performance in spotting, at least in the training phase. The selection or decision of the features may be carried out by some rationale, heuristically or by any practical manner such as according to accumulated experience of a trainer.

As an example, a trainer may select one feature of the plurality of features, together or without the PPE and check the training performance. If the performance is better than using just the PPE feature, the selected feature is maintained and another one may be selected. In case the performance is worse or not sufficiently better, the phrase feature may be ignored and other one may be selected. Thus, incrementally with possible backtracking, some features are determined as sufficient for the training.

It is noted that simply using many or all the phrase features may not improve the raining performance since the features are not necessarily independent of each other, and, thus, may operate destructively and/or divergently with subsequent adverse spotting.

The training may be tested, also during the progression thereof, by applying, the trained model on test data to check the phrase spotting performance. Yet, optionally, the training may be tested by the training set per se, such as in cross-validation.

Generally, without limiting, the training is performed or supervised by a trainer who is aided by tools such as tools for presentation or analysis or optimization. Optionally or alternatively, the training is performed by tools controlled or supervised by a trainer. The training is based on an audible speech corpus and/or its transcription thereof.

An exemplary non-limiting method according to the disclosed subject matter may include the following operations for training a classifying model to provide improved phrase spotting results:

Providing a training set comprising a corpus of speech with its textual transcription, and a set of training input phrases intended for spotting in a textual form. The training set may be provided along with the timestamp of each word.

Converting the training input phrases from the textual form to at least one phonetic representation for each input phrase.

Searching the phonetic representation of the phrases in the training set to obtain candidate events (or candidate representations) of the input phrase.

Calculating, for each candidate event in the training set, the PPE score and a plurality of phrase spotting features (e.g. stored as a feature vector), the features related to at least one of the input phrase, its decoding process, its context in the conversation and/or circumstances thereof, and/or a combination thereof.

Automatically, based on the provided textual transcription, determining if the candidate event is a true event (e.g. a true occurrence of the input phrase) or a false event (e.g. a misdetection), and tagging the candidate event accordingly.

Training a classifying model according to the set of phrase spotting features and according to the tagging result of all candidate events.

Providing a test set comprising test speech with its textual transcription, and one or more test input phrases in a textual form. The test input phrases may be different from the training set, or similar in certain cases, e.g. when a list of predetermined phrases is intended for spotting, and the training is performed on these phrases.

Converting the test input phrases from the textual form at least one phonetic representation for each test input phrase.

Searching the phonetic representation of the phrases in the test speech to obtain candidate events of the test input phrases in the test speech.

Calculating for each candidate event in the test speech, the PPE score and a plurality of phrase spotting features.

Applying the classifying model on the candidate events of the input phrase thereby obtaining a confidence score for spotting the test input phrase in the test speech.

Evaluating the classifying model based on the confidence score result and the textual transcription, by determining if the candidate event is a true event of a false event, and tagging the candidate event accordingly.

Optionally in the training phase of the classifying model, fine-timing the confidence score according to a predetermined transformation model or index, in order to provide a meaningful transformed score, e.g. a transformed score that indicates or is correlated to a predetermined characteristic such as: an accuracy level of spotting the phrase, a confidence level associated with spotting the phrase in the provided test speech, a false reject rate associated with spotting the phrase, etc.

In some embodiments, the classifying model is based on Support Vector Machines. (SVM), optionally using a liner kernel SVM for more efficient implementation. Optionally or alternatively, other classifying models may be used such as Artificial Neural Network (ANN) or Maximum Entropy Modeling (MaxEnt). In some embodiments, multiple classifiers e.g. in a decision tree or in a cascade of classifiers may be applied.

A potential technical effect of the disclosed subject matter is phrase spotting generally with higher reliability or confidence than what is conventional in the art.

Reference is now made to FIG. 1, which is a schematic illustration of a phrase spotting system for spotting phrases, according to embodiments of the present invention. An audio input unit 110 may be or may include, or may be operationally connected to a storage unit, a processor, a communication unit, etc. for storing, obtaining and/or accessing digital audio files of conversations. The audio input unit 110 may obtain the audio files in various audio formats, such as MPEG4, MP3, WAV, etc. In some embodiments, the audio files may be streamed into audio unit 110 to allow real-time analytics.

A phrase input unit 120 may be or may include a storage unit, used for storing or obtaining one or more phrases, e.g. a list of phrases that are to be searched or spotted in the obtained audio files. For example, the input unit may be a storage unit that stores a list of phrases to be searched in the obtained audio files. The phrases may be provided in textual format.

A model database 113 may include a set of pre-trained models which are used by a phrase spotting engine during the phrase spotting process. The models are binary files, which contain information used by the phrase spotting engine to perform the phrase spotting task. The models may be specific per language, per installation site of the phrase spotting system, or relevant for a certain context.

A phrase spotting engine 114 may be or may include a processor and/or software executable instructions, configured to perform one or more of the following operations:

- Partition each input phrase into phoneme sequences, e.g. by using a phonetic transcription dictionary, or by using an automatic phonetic transcription engine. Each phrase may be partitioned into one or more phoneme sequences.
- Decode the provided audio file into a phoneme lattice.
- Search the one or more phoneme sequences in the lattice to find probable or candidate events.
- Calculate the PPE score for each event, based on the PPE method. The PPE score may be stored in a storage unit, e.g. storage unit 10, and may be used to determine a confidence score as explained herein.

A classifying unit 121 performs post-processing operations and classification of the PPE scores obtained from phrase spotting engine 114, using a set of phrase spotting features, to obtain a confidence score per candidate event. The classifying unit 121 may be or may include a processing unit, or may be operationally connected to a processing unit, and may include (or may be operationally connected to) a storage unit, (e.g. storage unit 10).

A classifying model database 122 is for storing a set of pre-trained classifying models, parameters, values and data used in the classification operation performed by classifying unit 121. The classifying models may be dependent on context, e.g. on language, specific site, and/or a specific lexicon which is given for a site or location.

A score database 115 may be or may include (or may be operationally connected to) a storage unit that stores data related to a plurality of detected or probable or candidate events found by the phrase spotting engine 114. Data related to each candidate event may include:

- The input phrase detected.
- Time-related data, e.g. a timestamp in the provided speech that the input phrase was initially detected, and/or a time interval from the provided speech which includes the detected input phrase.
- A confidence score calculated for the candidate event a score or measure that estimates a confidence level of spotting the input phrase in the given speech calculated by classifiers 233 of the classifying unit 121, according to the classifying models database 122.
- A transformed score—the confidence score may be transformed according to a predetermined transformation or function, to obtain a transformed score for spotting the phrase in the given speech, the transformed score corresponding, e.g., to a probability indication, a confidence level or any other measure that a candidate event was indeed an occurrence of the input phrase in the provided speech.

In some embodiments, a threshold may be applied to the confidence scores or the transformed scores obtained for the candidate events, in order to achieve a desired accuracy or a desired working point that balances between accuracy and detection. For example, only candidate events that obtained a confidence score that is larger than or equal to a predetermined threshold value, may be considered probable events, and may be displayed or presented to a user. A tradeoff between accuracy and event detection exists: a higher threshold will typically cause the accuracy level of detected events to increase (e.g. the percentage of true events out of the total number of detected events), and the event detection level (e.g. the number of true events detected) to decrease. A lower threshold will typically cause the accuracy level to decrease, and the event detection level to increase. Thus, a selected threshold represents a working point with an associated expected accuracy and detection level.

Since the confidence score may be unreliable or inaccurate in certain cases, different thresholds may be applied to specific input phrases, to obtain the desired working points for the different phrases. Determining the appropriate threshold per phrase may be performed by a manual tuning process, e.g. by listening to the audio files and marking each event, e.g. storing an indication such as true or false per each candidate event. After collecting a sufficient amount of events, the phrase threshold can be set according to the desired working point of that phrase.

Figure 2:
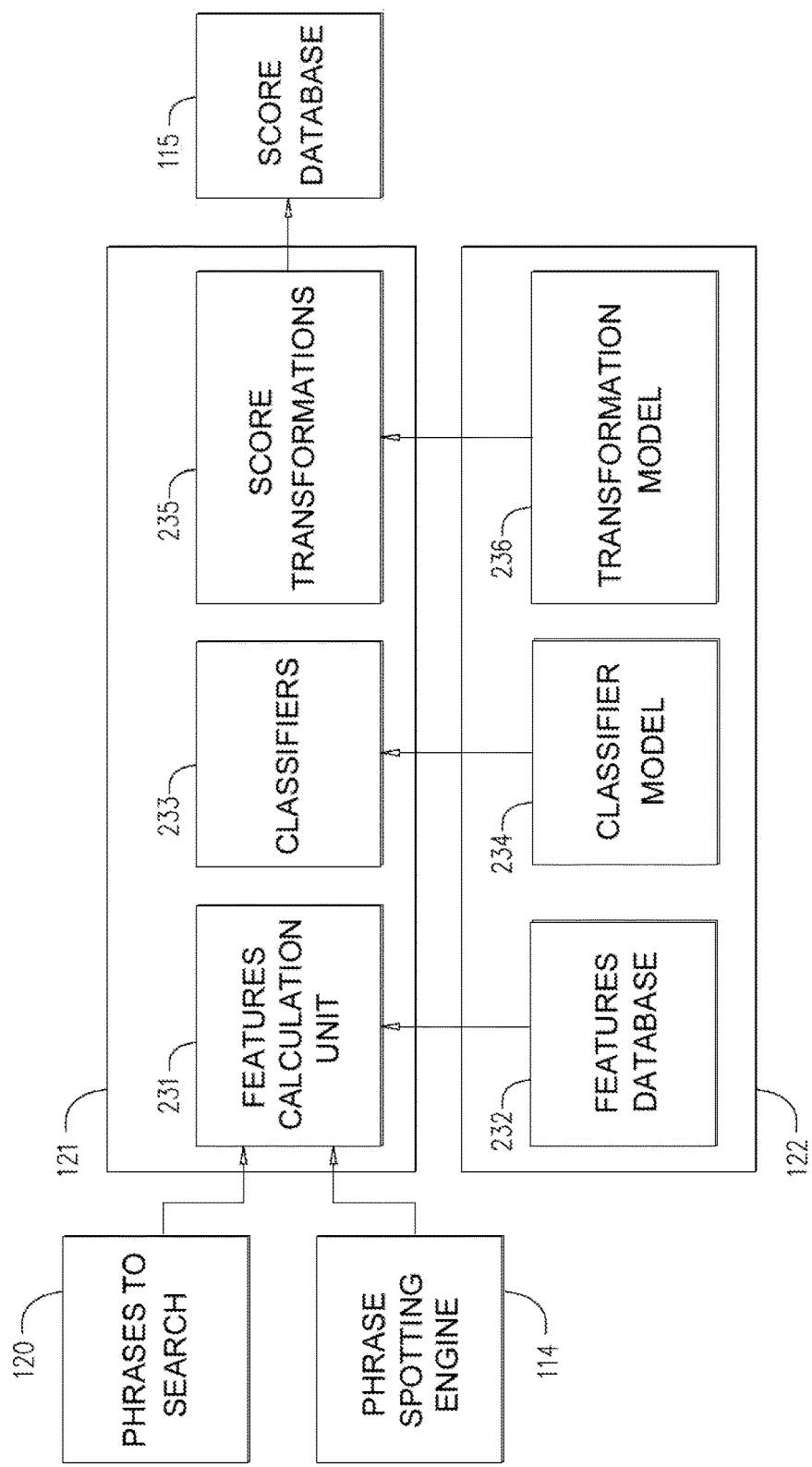
FIG. 2 is a schematic illustration of a classifying unit, according to exemplary embodiments of the disclosed subject matter.

Reference is now made to FIG. 2, which is a schematic illustration of a classifying unit, e.g. classifying unit 121, for determining a confidence score for spotting a phrase in audio input data, according to embodiments of the present invention.

The classifying unit 121 may include a features calculation unit 231. Features calculation unit 231 calculates a plurality of phrase spotting features a vector of features), and uses the calculated feature vector in a further classification operation to improve the PPE score which was calculated by the phrase spotting engine 114 using the PPE method. Various groups of phrase spotting features related to a given phrase or to a candidate event may be used for further classification of the phrase intended to be spotted, for example, phrase related features, event related features, decoding process features (related to the decoding process performed by the phrase spotting engine 114), context-based features and a combination thereof, e.g. features that are combined from one or more of the above features using a mathematical formula.

A first group of phrase spotting features includes phrase related features, related to a given phrase, which may be used by the classifying model. Such phrase related features may include or may be based on one or more of the following exemplary features: the number of words in the phrase, the number of phonemes or phoneme sequences in the phrase, the number of long phonemes in the phrase, the number of vowels in the phrase, and/or the number of possible phonetic transcriptions for the phrase. For example, a word or phrase may be pronounced in multiple possible pronunciations. Each pronunciation may be transcribed to a corresponding phonetic transcription, and the total number of the possible phonetic transcriptions may be used for classification and for improvement of a confidence score.

An additional phrase-related feature is, for example, a language model probability of occurrence of the phrase in a given audio input file. The language model probability of occurrence may be based on a language model, by calculating a probability of the phrase being said in the language. The language model probability of each of the phrase words may be used as another phrase-related feature.

A phonetic transcription probability score related to a probability of a certain phonetic transcription (the probability that the word/phrase is pronounced according to a specific phonetic transcription) may be another phrase related feature. When words are encountered that are not in the dictionary associated with the phrase spotting engine (out of vocabulary words), automatic phonetic transcription is required. Automatically transcribed words may be penalized, since the automatic phonetic transcription is expected to be less accurate than a known or verified phonetic transcription, and therefore candidate events that include such words should be scored with a lower confidence score.

Another phrase-related feature may include an expected time duration for the phrase for example calculated by accumulating the phonemes duration statistics for each phoneme, identified in the phrase. If the phonemes duration statistics are known a statistical expected duration of a word and/or a phrase may be calculated. Another optional phrase-related feature may be or may include an expected time duration for the words of the provided input phrase, e.g. using the phonemes duration statistics.

A second group of phrase spotting features related to spotting a given phrase which may be used by the classifying model may include features related to the decoding process of the phrase. For example, a normalized PPE score may be used as a feature for further classification of the PPE score for spotting a phrase. Since the PPE score is estimated rather than calculated, there are various parameters that may be used to normalize it, e.g. the candidate event's duration, the number of phonemes in the input phrase, and/or using different combinations of one or more normalization parameters.

Other optional features related to a given phrase which may be calculated or provided during the decoding process of the phrase include: timestamp or duration of the candidate, event that was detected, e.g. timestamp or time duration of the occurrence of the detected phrase in the provided speech or audio data. The timestamp or time duration may be relative to the duration of the input audio data or provided speech, and/or to the time from the beginning of the conversation. A timestamp of the candidate event's occurrence in the conversation can be used or included in context based features. For example, based on the candidate event's time in the conversation, context based features such as proximity to no-speech, proximity to competing words, time-relativity or proximity to events of related phrases, etc.

Additional optional features include a duration of each word in the candidate event, and/or a time duration per phoneme. For example, the duration per phoneme may be normalized according to predetermined phonemes duration statistics. In another example, normalization may be applied by dividing the duration of the phrase by the number of phonemes in the phrase, or by an expected duration calculated according to the phonemes duration statistics.

Other optional decoding process features related to a given phrase which may be calculated or provided during the decoding process of the phrase include edit distance metrics, e.g. quantification of how similar or dissimilar two strings (e.g. phrases or words) are, by counting the minimum number of operations required to transform one string into the other. For example, 1-best edit distance score may be used as a decoding process feature, calculated according to phoneme edit distance (e.g. Levenshtein distance) from 1-best path of the phoneme lattice, or lattice edit distance score (edit distance from the whole phoneme lattice with or without phoneme confusion matrix). The phoneme confusion matrix indicates a probability estimation for confusing 2 phonemes, and may be obtained during the training of the acoustic models 113.

Another decoding process feature which may be calculated or provided during the decoding process of the phrase is a hypothesis density, which indicates the number of hypothetical alternative routes or paths through the phoneme lattice. Acoustic matching is performed as part of the regular decoding process by the engine. An acoustic matching score of the candidate event may be used as another decoding process feature, which indicates how the input audio data matches the searched phrase acoustically. Additionally, acoustic matching score per word and/or per phoneme may be used as decoding process-features.

Yet another decoding process feature is a competing phrases score relating to competing phrases. Competing phrases are words or phrases that sound similar to the provided phrase and which are detected in substantially the same time interval (e.g. during an overlapping time interval or a partially overlapping interval) of the candidate event, but have a different meaning. For example, the phrase spotting engine may find different phrases occurring during the same time, or during an overlapping or partially overlapping time, or in the same time slot. For example, "happy" and "unhappy" are competing phrases, as are "two", "too" and "to".

The context of a spoken phrase may be determined based on the set of circumstances or facts that surround a particular phrase in a provided speech. For example, a context may be determined based on certain keywords identified in the provided speech.

Phrase spotting features related to a given phrase may include context-based features of the phrase, e.g. one or more of the following exemplary features:

Proximity to no-speech intervals in the provided speech, which may be determined based on a time duration detected between the candidate phrase and a no-speech interval. A no-speech interval may be identified e.g. using a voice activity detector (which may be implemented, for example, as part of phrase spotting engine)

Scores of associated phrases or context-dependent phrases detected in the provided speech—an associated phrase is a phrase that is statistically related to or associated with the input phrase. Two or more phrases that are likely to appear together in a conversation are considered associated phrases. For example, the phrase "leaving" may be associated to the phrase "going". If an associated phrase was detected elsewhere in the conversation, a higher value of score may be assigned to the candidate event that includes the associated phrase. Associate phrases may be established by collecting repeating events of co-occurrences. For example, by obtaining textually transcribed conversations, reoccurrences of phrases that appears together in conversations may be detected. In some embodiments, the list of associated phrases may be manually edited.

Speaking rate—Speaking rate is varied between people, and even changes during a conversation. The speaking rate may be calculated using graph phonemes duration statistics of the provided speech or conversation, compared with the model phonemes duration statistics. The durations of the phonemes and/or the phrase can be normalized according to the changing speaking rate. The speaking rate may be calculated from the phonetic lattice that was obtained during the decoding process.

It is noted that any combination of one or more the above phrase spotting features may be used as a feature in the process of classifying a candidate event and calculating the confidence score for the event, for example by utilizing linear or non-linear formulas that are based on one or more, e.g. a subset, of the above features.

Some exemplary phrase spotting features related to a given event which may be used in the calculation of a confidence score for a candidate event may include:

a PPE score, which is calculated by the phrase spotting engine 114, and is based on posterior probability estimation method.

a first normalized PPE score, e.g. normalized by the number of frames in the candidate event and/or a combination thereof, e.g. its logarithm. The frames are an indication of the duration of the audio data, and the audio data is analyzed according, to frames.

a second normalized PPE score. e.g. normalized by the number of phonemes in t given phrase and linear or non-linear combinations thereof, e.g. its logarithm.

a normalized edit probability score, which is based on the edit probability score, normalized e.g. by dividing the edit probability score by the number of phonemes in the given phrase. The edit probability is a confusion matrix penalty for phonemes differences in the phoneme lattice.

an edit distance from best path (or most probable path) in the phoneme lattice (1-best).

Edit distance 1-best divided by number of phonemes in the phrase.

Edit distance in the lattice (N-best).

Edit distance N-best divided by number of phonemes in the phrase.

Duration of the phrase and its inverse.

Number of words in the phrase and its inverse.

Number of phonemes in the phrase and its inverse.

Number of long phonemes in the phrase and its inverse.
  A long phoneme may be determined based on a time duration for pronouncing a phoneme, e.g. if the audible duration is longer than a predetermined threshold. The long phoneme set is a subset of the phoneme set, which includes phonemes with the longest duration. For example, duration of each phoneme may be measured and/or scored, and a subset of the phonemes, (e.g. a predetermined percentage, such as the top 20% or 50% of the longest durations), may be considered or determined as long phonemes.

Phrase duration divided by number of phonemes and combinations thereof, e.g. the inverse thereof (non-monotone features).

Phrase duration divided by number of long phonemes and combinations thereof, the inverse thereof (non-monotone features).

Number of possible phonetic transcriptions of the input phrase.

The classifying model database 122 may include a features database 232, which may be used for storing data related to calculating the phrase spotting features before and dining the decoding. Features database 232 may include the set of features which are used by the features calculation unit 231. The data related to features may include data that is obtained and collected in the training phase of the classifying model, for example, a set of phrase spotting features and the features parameters, e.g. typical values or ranges of values for each feature. The language model may be stored in the features database 232, and may be used for calculating features that require language model information.

In some embodiments, a set of long phonemes and/or a set of vowel phonemes may be stored in features database 232. In some embodiments, statistics related to duration of a phoneme (e.g. mean, median, standard deviation, etc.) may be stored in features database 232. In some embodiments, a list of competing words may be stored in features database 232, and may be used as additional search phrases (e.g., by operationally connecting to the phrase input unit 120). In some embodiments, classes of context-dependent words or phrases may be stored in features database 232.

One or more classifier/s 233 may receive, for every candidate event detected by the phrase spotting engine 114, a vector of calculated phrase spotting features from features calculation unit 231, and after the classification operation may provide a confidence score for matching each candidate event to the positive class (e.g., an event found by the phrase spotting engine 114). The one or more classifiers 233 are trained to provide high confidence scores for true events and low confidence scores for false events.

The one or more classifiers 233 may be implemented as a single classifier, or using a decision tree classifiers set or cascade of classifiers. For example, different classifiers may be used for phrases of differing length). In some embodiments, a single classifier may not be sufficient, and applying multiple classifiers e.g. in a decision tree classifiers set or cascade of classifiers may improve the obtained result or confidence score.

Various classifiers can be used to implement one or more classifiers 233, for example: SVM, ANN. Logistic function, and/or MaxEnt model. In an exemplary embodiment, a single SVM classifier with linear kernel may be used.

In some embodiments, non-monotonic features may be used. Non-monotonic features are features for which the true class is within a range of values, and the false class is defined outside that range of values, from both sides. For example, for the feature that is calculated by the number of phonemes in the phrase divided by the event duration, there is a typical range of values which produce a true classification result (event), and values that are either below or above that typical range are likely to be a false event. Non-monotone features cannot be used by linear kernel SVM. It may be advantageous to convert such non-monotonic features into monotonic features, e.g. by calculating an absolute value after subtracting a typical or average value.

In some embodiments, phrase spotting features may be scaled or normalized to reside within a certain range of values, e.g., in the range between $[-1:11]$. For example, a linear transformation may be used, in which the minimal value is set to be $(-1)$, and the maximal liable is set to be $(1)$. Other ranges of values may be selected, and otter values may be set accordingly.

The classifying model database 122 may also include a classifier model database 234, which may store values and/or parameters for performing the classification operation using the one or more classifiers 233. These parameters may be determined during a classifier training phase performed prior to the classification operation of classifying unit 121. The classifier model database 234 stores the phrase spotting features, and additional parameters, for example: parameters or rules for scoring candidate events that are on or near the separation plane of the one or more classifiers 233, and/or a set of rules that determine when to apply each of the one or more classifiers (for example when using cascading classifiers).

After applying the one or more classifiers 233 to the candidate events detected by phrase spotting engine 114, one or more trained monotone transformations 235 may be applied to the confidence score obtained from the classifiers, to obtain a transformed score that correlates to or indicates a meaningful characteristic or parameter, such as accuracy of detected events with a score above a predetermined threshold. Trained transformations 235 may be applied such that computation efficiency is enhanced, as further described herein.

One or more confidence score transformations 235 may include a monotone transformation of the result obtained from the classifiers 233 to obtain the final transformed score for a candidate event. The score transformations 235 may comprise a single transformation or decision tree transformations set. In some embodiments, a parametric function or a parametric representation may be used, e.g. a parametric equation of a curve to express the coordinates of the points of the curve as functions of the score obtained from the one or more classifiers 233. In some embodiments, a sampled function may be used, e.g. obtained by sampling a continuous function and applying interpolation between the samples. In an exemplary embodiment, a single transformation or multiple transformations based on phonetic length of the input phrase may be applied to obtain the transformed score.

By applying a score transformation after the classification operation by classifiers 233, the traditional classification scoring techniques are disregarded, and instead the system is trained to provide a meaningful score that is correlated, for example, with the accuracy of detected events with a score above a predetermined threshold.

The classifying model database 122 may also include a score transformation model 236 which is provided and priorly trained during the training phase of the improved phrase spotting system. The score transformation model 236 includes the trained data required for performing the confidence score transformations. Each transformation of the one or more score transformations 235 may require a set of parameters, e.g. if it is parametric function or a sampled function. If more than one transformation 235 is implemented, Score Transformation Model 236 may store a set of rules that determine when to apply each transformation.

Initially, a set of raw features may be calculated. Raw features may include a set of parameters on which one or more of the phrase spotting features are based. For example, phrase duration, number of words in the phrase, and number of phonemes in the phrase may be considered raw features. Raw features may be obtained prior to calculating the phrase spotting features.

Calculations may be performed on the raw features to obtain the phrase spotting features. Examples of phrase spotting features are: phrase duration divided by number of phonemes and combinations thereof, edit distance 1-best divided by number of phonemes in the phrase, etc. For example, the following equation may be used to calculate the features based on the raw features:

$$F_i; i=1:N \qquad \text{(eq. 1a)}$$

In order to enhance computational efficiency feature scaling may be performed to obtain feature values that are normalized to reside within a predetermined range of values, e.g. a linear transformation for obtaining a common range of values (such as [−1:1]). The following equation may be used to compute the scaled phrase spotting features is $$F_i^* = 1 - 2 * \frac{C_i^{high} - F_i}{C_i^{high} - C_i^{low}} = A_i * F_i + B_i \qquad \text{(eq. 1b)}$$

In some embodiments, the classification operation performed by classifying unit 121 may include a first monotone transformation for generating a confidence score indicating the classification result, based on the classifiers 233 or as part of the classifiers 233.

The following equation may be used compute the confidence score $S_{SVM}$ based on the SVM classification, the simplification in equation 3 is available when the kernel is linear:

$$\begin{aligned} S_{SVM} &= b + \sum_j \alpha_j y_j \sum_i SV_i^j * F_i^* \qquad \text{(eq. 2)} \\ &= b + \sum_i M_i * P_i^* \\ &= b + \sum_i M_i * B_i + \sum_i M_i * A_i * F_i \\ &= b^* + \sum_i M_i^* * F_i \end{aligned}$$

$$\boxed{M_i^* = M_i * A_i = \left[\sum_j \alpha_j * \gamma_j * SV_i^j\right] * \frac{2}{C_i^{high} - C_i^{low}}} \qquad \text{(eq. 3)}$$

Wherein:
$C_i^{high}$ are the highest values of Fi in the training set and $C_i^{low}$ are the lowest values of Fi in the training set, such that Fi* is bounded to the range of [−1,1],
Ai, Bi are representations of the linear equation, wherein Ai equals $$\frac{2}{C_i^{high} - C_i^{low}},$$

b, αj, yj, SVij are standard results obtained from SVM training,
$M_i$ equals $\Sigma_j \alpha_j^* y_j^* SV_i^J$.
$M_i^*$ is the result of the simplified calculation Type equatin here,
b* is a constant term,
i=1:N; N indicates the number of features in the feature set (e.g. 5-20 in one embodiment), and
j=1:J; J indicates the number of support vectors (e.g. 5,000-20,000 in one embodiment), and the SVM Model size is J*(N+1).

Calculating the SVM prediction transformation $S_{pSVM}$ may be done according to the following equation:

SVM prediction transformation $S_{pSVM} = T_{SVM}[S_{SVM}]$ (eq. 4)

AST transformation $S =_{NewScore} = T_{AST}[S_{pSVM}] = T^*[S_{SVM}] = T_{NS}[\Sigma_i M_i^* * F_i]$ (eq. 5)

Wherein $S_{NewScore}$ is the transformed score for spotting a phrase, $T_{NS}$ is the transformation to obtain the new score, and $T_{AST}$ is the adaptable score transformation.

T* is the combined monotone transformation (with SVM scoring transformation), $T_{svm}$ is the SVM scoring transformation, and $T_{ns}$- is T* with the b* factor.

In order to increase the computational efficiency, the above equations may be used. Without the simplifications marked in red, the on-site calculation complexity is ~O(J*N), and includes two transformations (first transformation computed by the linear kernel SVM classifiers 233 and a second trained monotone transformation 235).

In an exemplary embodiment, the first transformation computed by the linear kernel SVM classifiers 233 may be combined with a second trained monotone transformation 235, to enable simplification of the on-site or runtime calculation, e.g. to a simple dot product of the phrase spotting feature vector and the classifier models in classifier model database 234 with applying a single transformation. Such simplification may increase the computational efficiency for performing the classifying operation by classifying unit 121, e.g. confidence score calculation and transformed score calculation, with a minimal or very low run-time cost (e.g. substantially with no additional computation time, computational resources, or both).

When the classifiers 233 are SVM classifiers, the first monotone transformation may be computed according to a function of the distance from the separation hyper plane of the one or more classifiers 233. A second monotone transformation, e.g. one or more score transformations 235, may be sequentially applied to the result of the first monotone transformation (e.g. the obtained confidence score), to obtain the transformed score.

Implementing classifiers 233 as SVM classifiers with a linear kernel, combined with a monotone, transformation $T_{SVM}$ enables computing the improved phrase spotting score ($S_{NewScore}$), and also enables the following:

Computing all calculations involving support vectors ($SV_i^j$) in the training process $M_i$. Thus, it may be advantageous to use an SVM classifier with a linear kernel.

Computing the phrase spotting feature scaling calculations during the training process to obtain Mi*.

Training a transformation causes the calculation to be insensitive to a shift, thus enables ignoring the constant term (b*), which may be included within the trained transformation.

SVM Model size is reduced to N (the size of Mi* vector).

Applying only one transformation instead of two

The on-site calculation complexity which is achieved according to equation (3) is ~O(N), which is obtained by a dot product of two vectors of N elements each, plus a single transformation operation.

Figure 3:
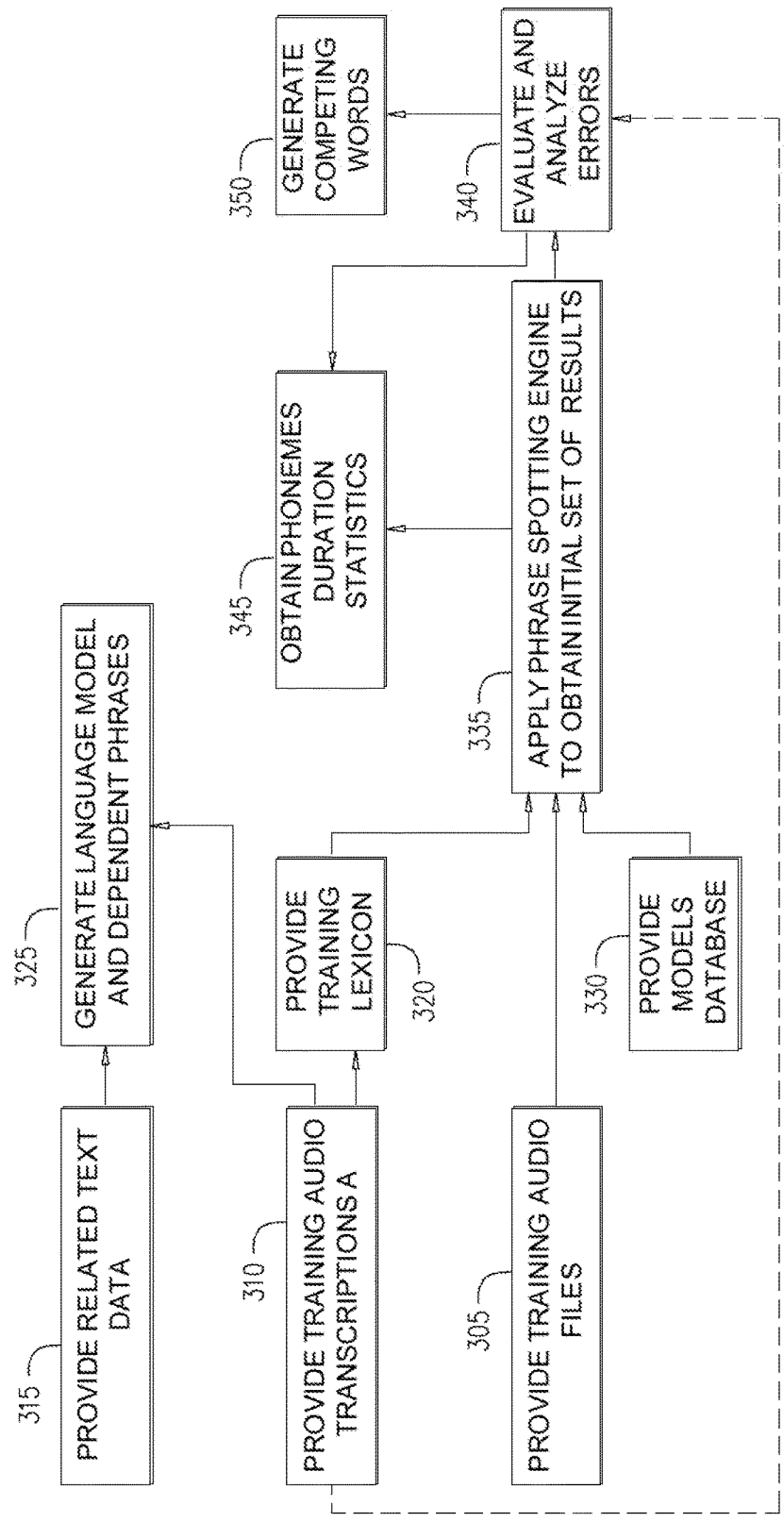
FIG. 3 is a schematic flow chart of an initiation process before training a classifying unit, according to exemplary embodiments of the disclosed subject matter.

Reference is now made to FIG. 3, which is a schematic illustration of a method for performing a data preparation stage, required before training an improved scoring system of a phrase spotting engine, according to embodiments of the present invention.

A training set of audio files are provided in operation 305. The audio files may include a plurality of conversation audio files, with similar environment to the site calls. The training audio files may be divided into a plurality of sets, for various training and/or evaluation operations.

A training set of audio transcriptions are provided in operation 310. These are the textual transcriptions of the training audio files provided in operation 305. The training audio transcriptions may be provided with timestamps, e.g. each word or phoneme may be associated with a timestamp of its occurrence in the given speech.

Related text data may be provided in operation 315. For example, any text database of one or more trained languages related to the calls or audio files provided in a certain site.

A training lexicon may be provided in operation 320. The training lexicon may include a list of phrases to be searched in the training audio files. The training lexicon may be selected from the training audio transcriptions to provide a significant amount of events. The training lexicon may be divided into a plurality of sets, to allow various training and/or evaluation operations. The training lexicon may be aggregated them into classes e.g. according to the phrase length—phrases may be divided into classes of short, medium, and long phrases.)

One or more language models may be provided or trained from 310, 315 in operation 325. The language models provide a probability estimation of occurrences of words/phrases in the spoken language. Operation 325 may also provide sets of dependent phrases, e.g. context dependent words or phrases, which are established by collecting repeating events of co-occurrences of the words/phrases. By obtaining textually-transcribed conversations, it is possible to find occurrences of phrases that appear together in conversations (e.g. in the same conversation, or during a certain predetermined time interval, etc.), and which are determined as dependent or related phrases.

In some embodiments, the language model may be manually edited or fine-tuned, e.g. by manually adding and/or removing certain phrases or sets of dependent phrases.

In operation 330, a models database may be provided, e.g. models database 113 of FIG. 1. In operation 335, the phrase spotting engine is applied, utilizing the provided training lexicon and the provided models database 113, to obtain a set of initial phrase spotting results, which is calculated prior to training the improved phrase spotting scoring system. The set of initial results includes a list of candidate events, and data related to each candidate event, e.g. the timestamp or time interval of the event, the PPE score obtained from the phrase spotting engine 114 for the event, and/or the vector of calculated phrase spotting features. In addition, a phoneme lattice is generated or provided for every training audio file.

In operation 340, an evaluation/error analysis phase is performed. The candidate events provided in the set of initial phrase spotting results are compared to the training audio transcriptions which were provided in operation 310, including the timestamp and/or time duration. Each candidate event is marked or tagged, e.g. indicated as true or false, and certain quality measures may be associated with the tagging result. For example, quality measures such as accuracy or precision at a specific detection or recall threshold and vice versa, F-score, area under Detection Error Tradeoff (DET) curve, false acceptance rate (FAR) at specific false rejection rate (FRR) and vice versa, may be calculated, and combining these quality measures into a single training quality score may provide an indication related to the quality of the initial phrase spotting results.

One or more of the following measures may be combined to obtain a training quality score:

Constant threshold mode (constant threshold is determined for all phrases)—optimal working point score and its standard deviation for various phrases.

Optimal working point mode (different thresholds for various phrases)—optimal working point score, its standard deviation and the standard deviation of the thresholds for the various phrases of the provided lexicon.

In one embodiment, the optimal working point method may be used as maximum detection for constant FAR. Maximum F-score for a constant beta factor is also supported as optimal working point method. The F-score is calculated from precision (accuracy) and recall (detection). The beta factor is a weighting parameter that determines the ratio between the precision and the recall.

As part of the evaluation phase performed in operation 340, an error analysis phase may be performed. For example, the worst results may be selected and then analyzed to determine failure patterns.

In operation 345, phonemes duration statistics and a long phoneme set may be generated, or extracted from the phoneme lattice. For example, duration statistics for each phoneme may be extracted from the phoneme lattice. To achieve accurate results, the lattice information may be filtered, for example, by using intervals between true detected events (as obtained in operation 340), using only 1-best (or most probable) phonemes, and/or determining a threshold for the acoustic score of the phoneme in the phoneme lattice. Only phonemes with an acoustic score higher than a predetermined threshold may be used in the calculation of the duration statistics. The target of this operation is to collect all the phonemes recognized during the decoding of the audio into the phoneme lattice, which are associated with the largest confidence level that they are correct, and to calculate duration statistics per phoneme.

In operation 350, a list of competing words may be generated. The competing words are words or phrases that sounds similar but have a different meaning. A large lexicon may be used, in order to identify repeating errors. By finding patterns in cases where more than one phrase was found in the same time slot, competing words may be identified.

The list of competing words may also be generated by looking at the engine dictionary for similar transcribed words. Most confused phonemes can be found using a confusion matrix. The transcription dictionary may be searched for words with a similar or close phonetic transcription. The phonemes confusion matrix can be used to score the transcription similarity.

In some embodiments, the list of competing words may be manually generated or enhanced during the error analysis operation 340. For example, repeating errors of the engine may be collected and stored in the list of competing words.

Figure 4:
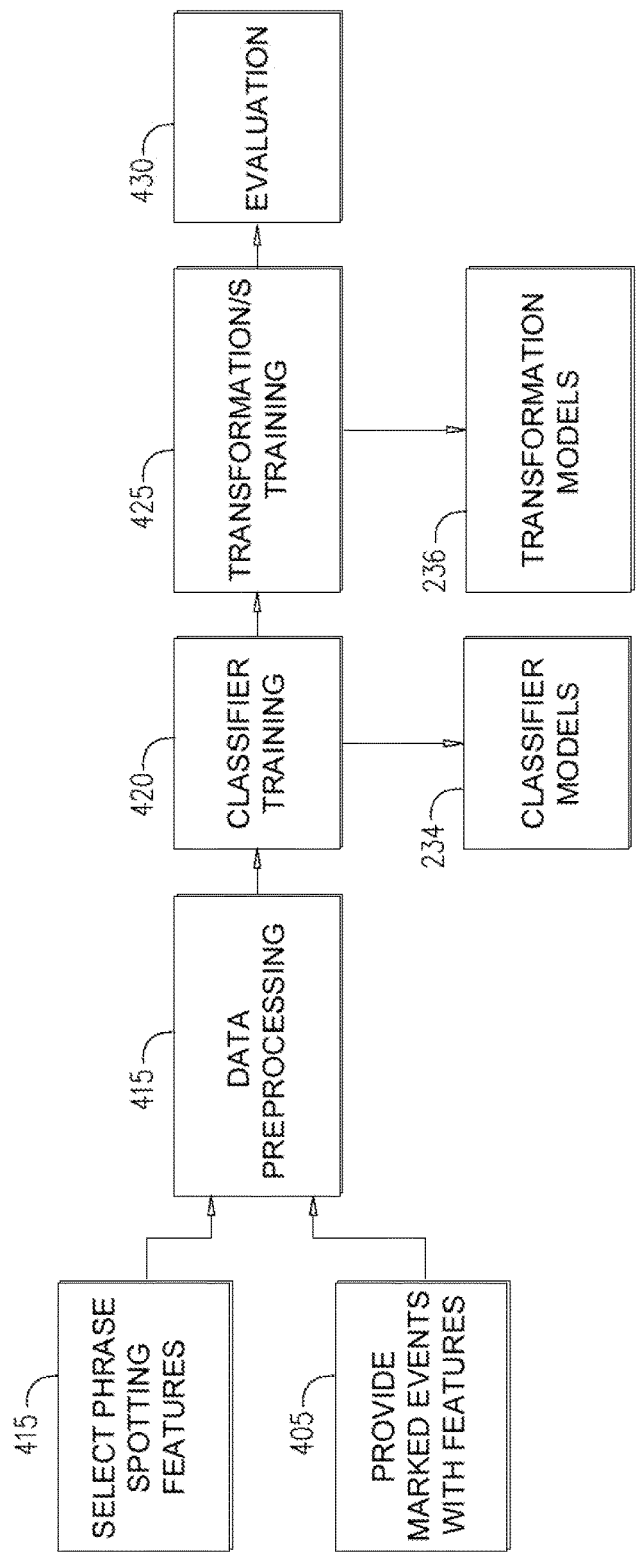
FIG. 4 is a schematic flow chart of a method for training a classifying unit, according to exemplary embodiments of the disclosed subject matter.

FIG. 4 is a schematic illustration of a method for training an improved phrase spotting system, according to embodiments of the present invention.

In operation 405, marked events with all supported raw features are provided from operations 335 and 340 for training the improved scoring of a phrase spotting engine. A list of the candidate events is provided, including the timestamp and/or duration of the event, the certainty result, and the vector of phrase spotting features calculated for the event. Each candidate event may be marked or indicated as a true/false event, according to the provided textual transcriptions. The indications of true/false may be performed manually, e.g. by a trainer, or automatically by a processing unit that compares the events to the audio transcription (see 340).

In operation 410, the selection of phrase spotting features to be used in the training is performed. The feature selection process is further described with relation to FIG. 5 herein.

In operation 415, data preprocessing is performed to prepare the data for the classifier training. The selected phrase spotting features are calculated from raw features, and non-monotonic features are converted to monotonic features, e.g. as described with relation to FIG. 3 herein.

Typically, the audio data is imbalanced, e.g. the false class may be much larger than the true class, or the ratio between true events to false events may be small. Since some classifiers training (such as SVM) are sensitive to imbalanced data several techniques may be utilized to compensate for or overcome such imbalance. In one example, the false class may be decreased, e.g., by thresholding the PPE score and/or adding, a random down sample. A random downsample may be based on a desired true to false ration. For example, if 500 true events and 5000 false events are available, to obtain a true to false ratio of 1:2, 1000 false events may be randomly selected out of the 5000 available false events. In another example, the classifier may be biased, e.g. by providing a different cost factor for the true class and for the false class. In yet another example the true class may be boosted, e.g. by up sampling the true class or synthesizing additional true samples from available true samples (boosting).

Features scaling may be performed as part of the preprocessing operations, e.g. phrase spotting features may be scaled or normalized to reside within a predetermined range of values.

In operation 420, the one or more classifiers (e.g. classifiers 233 may be trained to obtain classifier model database 234. Training of the classifiers may be performed according to known methods.

In operation 425, the transformation is may be trained to obtain transformation models 236. A monotone transformation may be trained to convert the classifiers score to a meaningful transformed score. The transformed score may be aimed to indicate or correlate to one or more meaningful parameters, such as accuracy, FRR, FAR, or to match the PPE scoring distribution using histogram matching.

For example, a single transformation or multiple transformations may be based on one or more phrase spotting features or combinations thereof, such as phonetic length of the phrase. The transformations may be a sampled function, using interpolation between samples. In some embodiments, the transformation aims to provide the following: histogram matching for true events, histogram matching for false events, accuracy, and/or FRR.

Operation 430 may include an evaluation or analysis phase of the training phase of the improved phrase spotting system, e.g. similar to evaluation/error analysis operation 340 which is performed in the data preparation stage, prior to the training of the classifying model.

Operation 430 includes comparing the candidate events in the set of trained phrase spotting results (obtained after the training of operations 420 and 425), to the training audio transcriptions which were provided in operation 310 of FIG. 3, including the timestamp and/or time duration of each event. Each candidate event is marked or tagged, e.g. indicated as true or false, and certain quality measures may be associated with the tagging result. For example, quality measures such as accuracy or precision at a specific detection or recall threshold and vice versa, F-score, area under Detection Error Tradeoff (DET) curve, false acceptance rate (FAR) at specific false rejection rate (FRR) and vice versa, may be calculated, and combining these quality measures into a single training quality score may provide an indication related to the quality of the trained phrase spotting results.

One or more of the following measures may be combined to obtain a trained classifying model quality score:
  Constant threshold mode (a constant threshold is determined for all phrases)—optimal working point score and its standard deviation for various phrases.
  Optimal working point mode (different thresholds for various phrases)—optimal working point score, its standard deviation and the standard deviation of the thresholds for the various phrases of the provided lexicon.

In one embodiment, the optimal working point method may be used as maximum detection for constant FAR. Maximum F-score for a constant beta factor is also supported as optimal working point method. The F-score is calculated from precision (accuracy) and recall (detection). The beta factor is a weighting parameter between the precision and the recall.

As part of the evaluation phase performed in operation 430, an error analysis phase may be performed. For example, the worst trained phrase spotting results may be selected and then analyzed to determine failure patterns.

The evaluation is automatically performed after selecting a metric that provides a single trained classifying model quality score for evaluating the quality of the classifying model. For example, one metric that a quality score may be based on may include a weighted average of one or more indexes, such as accuracy or precision at a specific detection or recall threshold, F-score, area under Detection Error Tradeoff (DET) curve, false acceptance rate (FAR) at a specific false rejection rate (FRR), etc.

A constant threshold mode of the evaluation may include a constant threshold that is determined for all phrases e.g. an optimal working point score and its standard deviation for various phrases.

An optional working point mode of the evaluation, e.g. different thresholds for various phrases may be determined as an optimal working point score, its standard deviation and the standard deviation of the thresholds for the various phrases of the provided lexicon. In one embodiment, the optimal working point method may be used as maximum detection for constant FAR. Maximum F-score for a constant beta factor may also be used in an optimal working point method.

Figure 5:
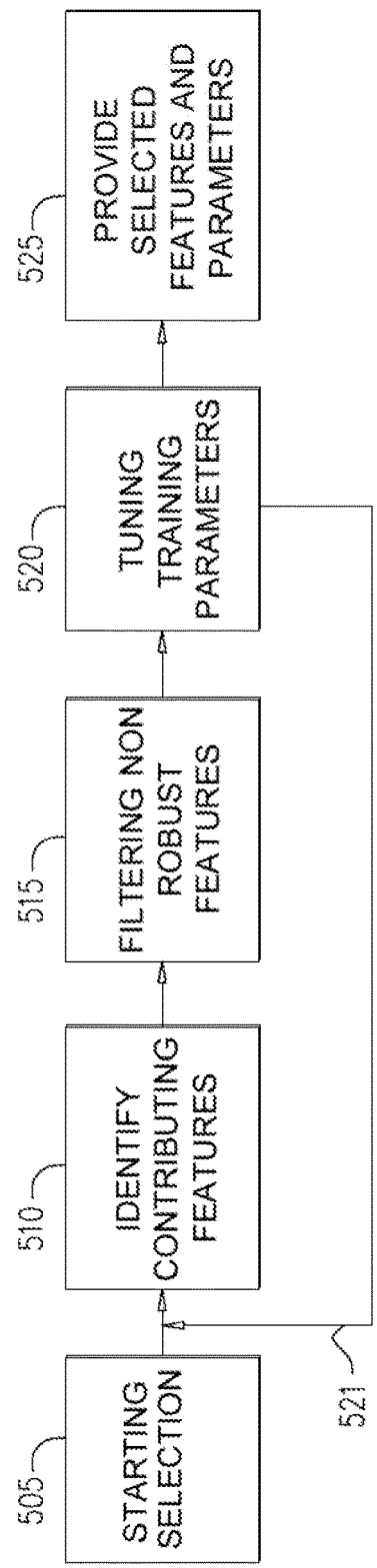
FIG. 5 is a schematic flow chart of a method for providing a set of selected features and parameters for use in a classifying unit, according to exemplary embodiments of the disclosed subject matter.

Reference is now made to FIG. 5, which is a schematic illustration of a method for selecting phrase spotting features and tuning training parameters of a classifier model for phrase spotting, according to embodiments of the present invention. This method is efficient for selecting features in cases where a dominant feature (e.g., the PPE feature) is enhanced with information from other features.

In operation 505, the feature selection process is initiated with a selection of a single feature from a provided or initial set of phrase spotting features, e.g. the PPE score generated by the phrase spotting engine 114.

In operation 510, contributing features are identified, as further described in FIG. 5 herein. The process of evaluating the result and adding or removing a single feature is iterative, as indicated by arrow 521. In each iteration, a single feature set is used for training and evaluation (*eluding measuring its robustness), e.g. using cross validation. Selection of features and training parameters tuning may be performed automatically or partially automatically.

The N-fold cross validation (e.g. 10-fold) is utilized to reduce the chances for over-fitting of the training data. To perform N-fold cross validation, the training data set may be divided into N subsets. The classifier model may be trained on N−1 subsets, and the results may be evaluated on the single subset that was not trained. This process may be repeated N times, in each repetition a different test set may be used. The results are accumulated from each iteration to obtain an overall result.

When there is more than a single classifier or transformation and a decision tree determines which one to use, the events needs to be aggregated to separate sets for training the various classifiers/transformations.

Figure 7:
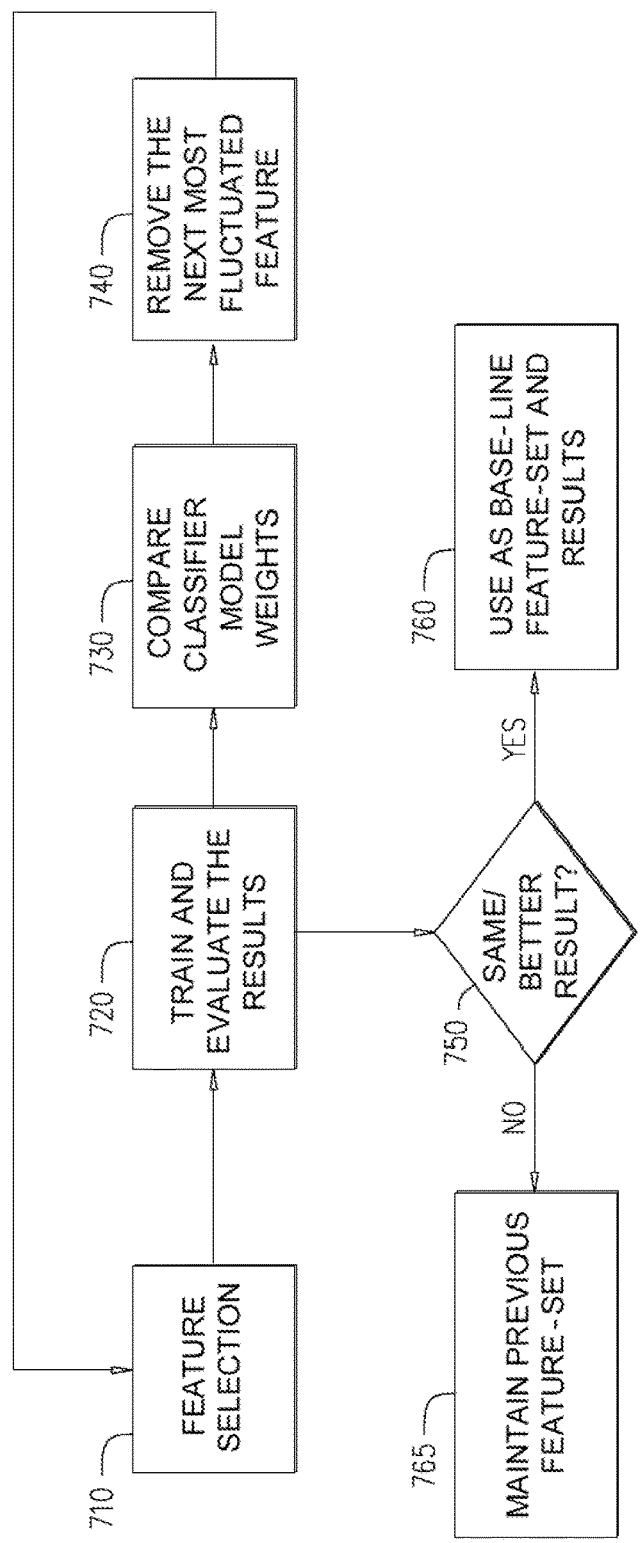
FIG. 7 is a schematic flow chart of a method for filtering non-robust features from a provided set of features, according to exemplary embodiments of the disclosed subject matter.

In operation 515, non-robust features are removed from the set of selected features, as further described in FIG. 7 herein.

The removal may be performed for linear kernel SVM or for any classifier that produces a comparable vector of weights using N-fold cross validation. Filtering the non-robust phrase spotting features may be implemented for example by calculating the trained weights statistics between the N-fold training results, and removing features with low contribution and/or high fluctuations, e.g. as further detailed in operation 730 of FIG. 7 herein.

It is noted that in some embodiments, it is preferable to maintain fewer features that are to be used in the classification process, even if a minor reduction of the quality of the results (as indicated by the trained classifying model quality score) is caused. After operation 515 a set of features is selected. In one embodiment, 5-15 features may be selected.

In operation 520, parameters of the training process and the selected features are fine-tuned, e.g. by changing one or more parameters and evaluating the quality results. Various optimization technics may be used to obtain an optimal training configuration.

Additional iterations of operations 510, 515 and 520 may improve the phrase spotting results, as indicated by arrow 521. These additional iterations may be selectively performed, e.g. only for features that do not provide a clear contribution or improvement to the phrase spotting results, and/or for parameters that have the largest impact on the phrase spotting results. The features that have the largest or a substantial impact on the phrase spotting results may be selected automatically after a single iteration of operations 510, 515 and 520.

In operation 525, the selected features and parameters are provided for a training phase as the selected configuration, e.g. as described in FIG. 4. The set of selected features and timed parameters may be used to train the classifiers 233, e.g. using the entire training set or a portion thereof. The phrase spotting results obtained with the set of selected features may be compared to the phrase spotting results obtained for the test set using the PPE score (e.g., as detailed in the evaluation operation 430).

Figure 6:
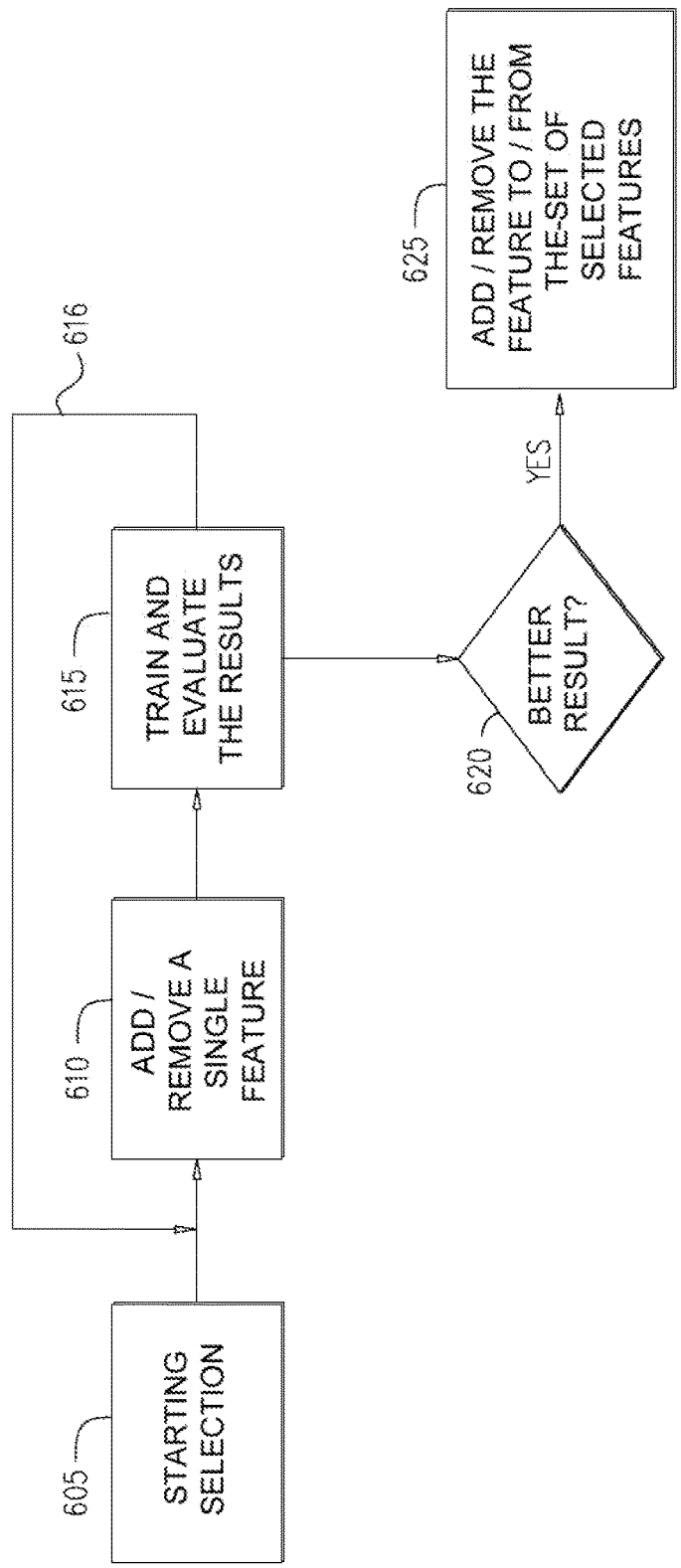
FIG. 6 is a schematic flow chart of a method for identifying contributing features for use in a classifying unit, according to exemplary embodiments of the disclosed subject matter.

Reference is made to FIG. 6, which is a method for identifying and/or selecting a subset of contributing features to be used in a classification operation of candidate events (operation 510), the features selected from a first set of phrase spotting features which are evaluated according to embodiments of the invention described herein.

In operation 605, the identification process is initiated with one or more features of an initial subset of selected features, for example, the PPE feature may be a first selected feature included in an initial subset of selected features. In some embodiments, a predetermined subset of features from the supported features set may be used as an initial subset.

In operation 610, in each iteration, a single feature is added to or removed from the initial subset of selected features. In the first iteration a single feature may be added to the initial subset of selected features which includes only the PPE feature, and in each subsequent iteration indicated by arrow 616, a single feature is added to or removed from the initial subset of features.

In operation 615, training and evaluation of the phrase spotting results obtained after the phrase spotting classification process are performed, e.g. by calculating a trained classifying model quality score as described in operation 430. For example, a cross validation process such as N-fold cross validation may be utilized (e.g. as described with relation to FIG. 4). Operations 610 and 615 are repeated, as indicated by arrow 616, for each feature of the set of phrase spotting features that is to be examined.

In operation 620, the evaluation results of the current subset of selected features are compared to the evaluation results of the initial subset of selected features. If the added (or removed) feature produces a better result compared to the evaluation result of the initial subset (e.g., better trained classifying quality score), then in operation 625 the examined feature is added to (or removed from) the subset of selected features which provides the input of selected features to be used in operation 515 of FIG. 5. This method allows generating a list of selected features for the next phase of the training, without needing to check all possible permutations or combination of features in the first (complete) set of phrase spotting features. Otherwise, if the evaluation result is the same or worse than the evaluation results of the initial subset, the examined feature is not added to (or not removed from) the subset of selected features.

FIG. 7 is a flow chart of a method for removing non-robust features from the subset of features to be used in the phrase spotting classification process, according to embodiments of the present invention. In some embodiments, this method may be performed as part of operation 515 of FIG. 5).

In operation 710, the filtering non-robust features process is initiated, starting with an initial set of features, e.g. the subset of selected features determined after operation 625.

In operation 720, training and evaluation of the evaluation results is performed, e.g. using N-fold cross validation of training and evaluating procedure (similar to the cross validation operations described in FIG. 5). If the evaluation indicates a better evaluation result quality compared to the evaluation results of the previous subset, or the same evaluation quality result, the new subset of selected features is preferred, and from now on, it will be used as the selected subset.

In operation 730, classifier model weights are compared. For linear SVM classifiers 233, the classifier models in classifier model database 234 can be represented as a vector of weights in the size of the subset of selected features. In the N-fold cross validation, N classifier models are trained using N slightly different data sets. Comparing the N classifier models (or N vectors), the most fluctuated features may be determined. These features may be unfitting or inappropriate for use in the classifying model, for example they may cause over-fitting of the training data, or they may be highly correlated to another feature, thus causing both features to be non-robust. Removing these features from the set of selected features one at a time, is likely to produce better phrase spotting results.

In operation 740, the next most fluctuated feature may be removed, e.g. the feature with highest value of the absolute of the relative standard deviation (RSD), defined as the ratio of the standard deviation to the mean.

In operation 750, the method may include determining whether the evaluation result is improved or not, compared to the previous quality result (quality score). Based on the determination, either the subset of features is determined as base-line feature-set and the quality results in operation 760, or the previous feature set is maintained in operation 765.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

As used herein, the term 'server' denotes a computerized apparatus providing data and/or operational service or services to one or more other apparatuses.

The terms 'configuring' and/or 'adapting' and/or 'determining' and/or 'calculating' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof. The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A method for improving a phrase spotting confidence score, comprising:
providing, to a processor, a test speech and a transcription thereof;
obtaining, by the processor, an input phrase in a textual form for spotting in the provided test speech;
partitioning, by the processor, the input phrase into one or more phoneme sequences;
searching the one or more phoneme sequences in a phoneme lattice, by the processor, to find candidate events of the input phrase in the test speech;
calculating, by the processor, a posterior probability estimation (PPE) score for each of the candidate events;
generating, by the processor, a phonetic transcription for the input phrase;
applying, by the processor, a classifying model to the phonetic transcription of the test speech according to a posterior probability feature based on the calculated PPE scores and to a set of phrase spotting features related to the input phrase, the phrase spotting features selected from features extracted from a decoding process of the phrase, context-based features, or a combination thereof, thereby spotting the given phrase with a confidence score; and
using a trained monotone transformation, by the processor, to simplify the feature normalization and a Support Vector Machine (SVM) model into a single vector in a size of the phrase spotting feature set;
wherein the classifying model utilizes the Support Vector Machine (SVM) with a linear kernel;
wherein the features related to the input phrase are selected from phrase-related features, event-related features, decoding process features, context-based features, or a combination thereof;
wherein at least one feature related to the input phrase is based on a number of long phonemes of the input phrase with phoneme time durations longer than a predefined threshold; and
wherein the classifying model is priorly trained for spotting the input phrase according to the posterior probability feature and to the set of phrase spotting features.

2. The method according to claim 1, further comprising transforming the confidence score according to a predetermined trained transformation, to obtain a transformed score.

3. The method according to claim 2, comprising calculating one or more trained transformations to obtain a transformed score that is correlated to a predetermined characteristic.

4. The method according to claim 1, wherein the classifying model is priorly trained according to a target context, language, accent, or scope.

5. The method according to claim 1, wherein the training of the classifying model includes adaptation of the classifying model to a specific lexicon.

6. The method according to claim 1, wherein the classifying model is priorly trained to enhance a confidence level of identifying the input phrase.

7. The method according to claim 1, wherein the at least one feature related to the input phrase is based on an edit distance score in a lattice of the input phrase.

8. The method according to claim 1, wherein the at least one feature related to the input phrase is based on a number of possible phonetic transcriptions of the input phrase.

9. The method according to claim 1, wherein the at least one feature related to the input phrase is based on an edit probability score of the input phrase.

10. The method according to claim 1, comprising identifying a subset of contributing features from a preliminary set of phrase spotting features.

11. The method according to claim 10, comprising filtering non-robust or correlative features using a cross validation procedure.

12. The method according to claim 10, wherein identifying a subset of contributing features from a supported set of phrase spotting features comprises:
determining, an initial subset of selected features; and
for each feature in the supported set of phrase spotting features, adding the feature to or removing the feature front the initial subset of selected features to obtain a temporary subset, training the classifiers using the temporary subset of features, and evaluating the quality of the phrase spotting results obtained after the phrase spotting classification process is performed using the temporary subset of features.

13. A method for improving a phrase spotting confidence score, comprising:
providing, to a processor, a test speech and a transcription thereof,
obtaining, by the processor, an input phrase in a textual form for spotting in the provided test speech;
partitioning, by the processor, the input phrase into one or more phoneme sequences;
searching the one or more phoneme sequences in a phoneme lattice, by the processor, to find candidate events of the input phrase in the test speech;
calculating, by the processor, a posterior probability estimation (PPE) score for each of the candidate, events;
generating, by the processor, a phonetic transcription for the input phrase; and
applying, by the processor, a classifying model to the phonetic transcription of the test speech according to a posterior probability feature based on the calculated PPE scores and to a set of phrase spotting features related to the input phrase, the phrase spotting features selected from features extracted from a decoding process of the phrase, context-based features, or a combination thereof, thereby spotting the given phrase with a confidence score; and
using a trained monotone transformation, by the processor, to simplify the feature normalization and a Support Vector Machine (SVM) model into a single vector in a size of the phrase spotting feature set;
wherein the classifying model is priorly trained for spotting the input phrase according to the posterior probability feature and to the set of phrase spotting features;
wherein the classifying model utilizes the Support Vector Machine (SVM) with a linear kernel.

14. A method for improving a phrase spotting confidence score, comprising:
providing, to a processor, a test speech and a transcription thereof;
obtaining, by the processor, an input phrase in a textual form for spotting in the provided test speech;

partitioning, by the processor, the input phrase into one or more phoneme sequences;

searching the one or more phoneme sequences in a phoneme lattice, by the processor, to find candidate events of the input phrase in the test speech;

calculating, by the processor, a posterior probability estimation (PPE) score for each of the candidate events;

generating, by the processor, a phonetic transcription for the input phrase; and applying, by the processor, a classifying model to the phonetic transcription of the test speech according to a posterior probability feature based on the calculated PPE scores and to a set of phrase spotting features related to the input phrase, the phrase spotting features selected from features extracted from a decoding process of the phrase, context-based features, or a combination thereof, thereby spotting the given phrase with a confidence score;

using a trained monotone transformation, by the processor, to simplify the feature normalization and a Support Vector Machine (SVM) model into a single vector in a size of the phrase spotting feature set;

identifying, by the processor, a subset of contributing features from a preliminary set of phrase spotting features; wherein identifying the subset of contributing features from a supported set of phrase spotting features further comprises:

determining, by the processor, an initial subset of selected features; and for each feature in the supported set of phrase spotting features, by the processor, adding the feature to or removing the feature from the initial subset of selected features to obtain a temporary subset, training the classifiers using the temporary subset of features, and evaluating the quality of the phrase spotting results obtained after the phrase spotting classification process is performed using the temporary subset of features;

wherein the classifying model utilizes the Support Vector Machine (SVM) with a linear kernel; and wherein the classifying model is priorly trained for spotting the input phrase according to the posterior probability feature and to the set of phrase spotting features.

\* \* \* \* \*